C. FELT.
WEED EXTERMINATOR.
APPLICATION FILED SEPT. 1, 1911.
1,063,250.
Patented June 3, 1913.
2 SHEETS—SHEET 1.
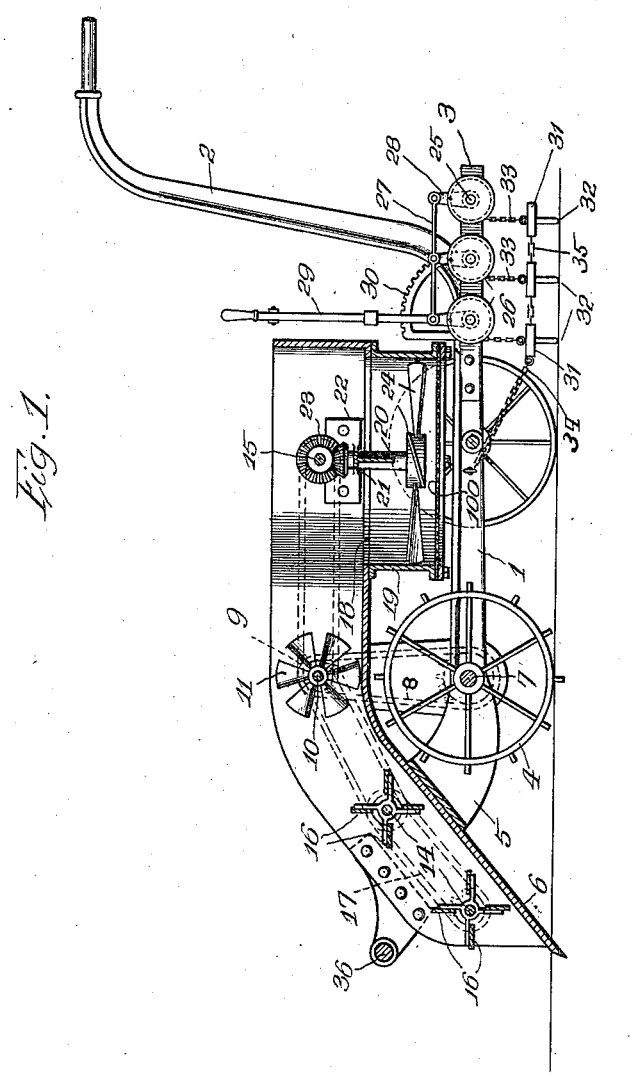
Witnesses:
Inventor:
C. Felt C. FELT.
WEED EXTERMINATOR.
APPLICATION FILED SEPT. 1, 1911.
1,063,250.
Patented June 3, 1913.
2 SHEETS—SHEET 2.
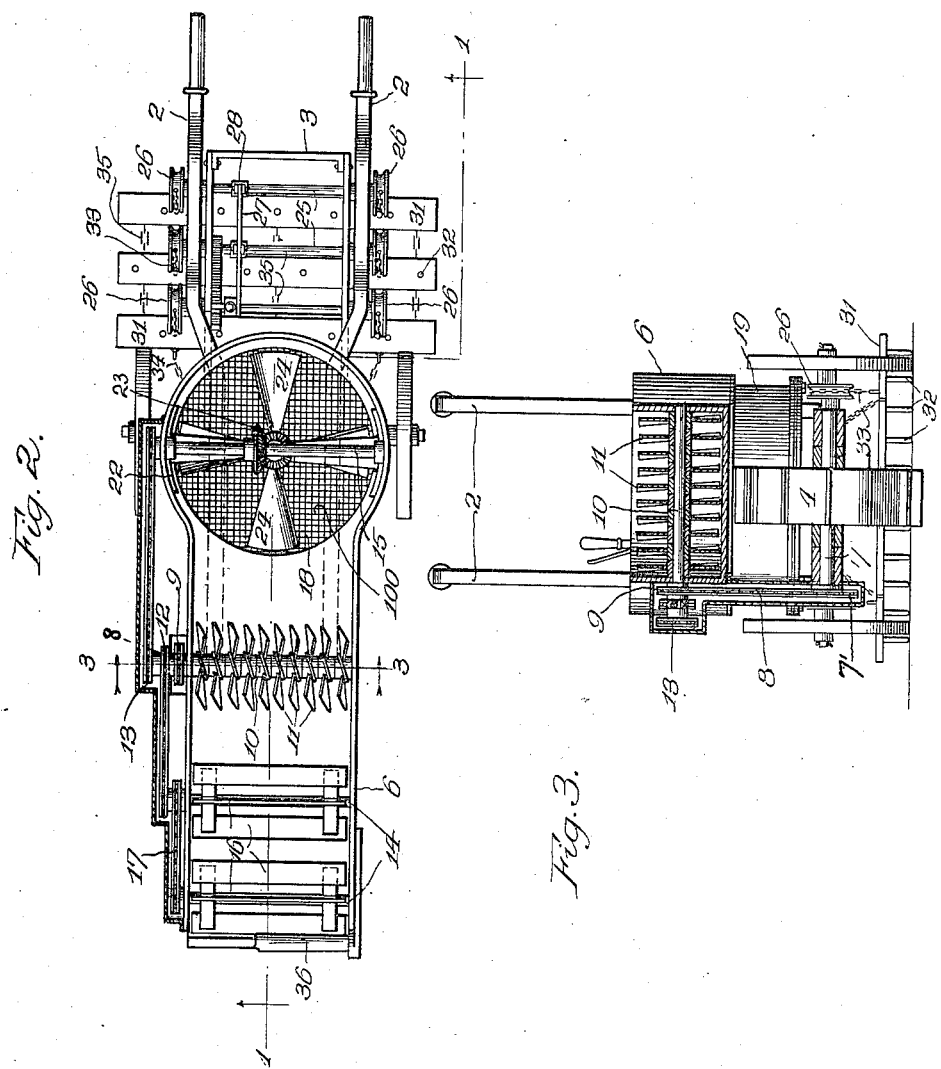

UNITED STATES PATENT OFFICE.

CHRISTINA FELT, OF BROCKET, NORTH DAKOTA.

WEED-EXTERMINATOR.

1,063,250.  Specification of Letters Patent.  Patented June 3, 1913.

Application filed September 1, 1911. Serial No. 647,212.

*To all whom it may concern:*

Be it known that I, CHRISTINA FELT, a citizen of the United States, residing at Brocket, in the county of Ramsey and State of North Dakota, have invented certain new and useful Improvements in Weed-Exterminators, of which the following is a specification.

This invention relates to grass, weed and thistle destroyers, and it is particularly adapted to utterly destroy and permanently eradicate growths of this nature that are undesirable. This destroyer first plows up the undesirable growth and then cuts or chops up the plowed mass, collecting the roots and tops of the weeds and grasses and permitting the fine earth to be screened back into the furrow. A subsidiary destroyer or follower is also a part of my machine and its purpose is to further tear up the earth in the plowed path and so to make impossible the escape of any deep roots that may not have been encountered by the plow or blade at the front end of the machine.

A full description of the invention will be set forth in the following specification, pointed out in the claims and illustrated in the accompanying drawings which form a part of the specification and in which—

Figure 1 is a longitudinal section of the machine shown in side elevation and is taken on line 1—1 of Fig. 2. Fig. 2 is a plan of the machine. Fig. 3 is a transverse section taken on line 3—3 of Fig. 2.

Like reference characters indicate corresponding parts throughout the several views.

1 is the main frame of the machine to the rear end of which the handles 2 and the drag or follower frame 3 are secured; to the front end of the machine a traction wheel 4, which also supplies power to run the rotary mechanism within the machine, is secured and the frame is further supported by other wheels as shown.

5 is a support secured to the front of the frame 1 for the support of the carrier chute 6 which has its forward end inclined toward the ground and the projecting end of the floor is adapted to enter the ground and plow up the same with such undesirable weeds and grasses as may be encountered. The carrier chute 6 extends from the extreme front end of the machine to the rear end of the main frame. The axle 7 of the traction wheel 4 is prolonged upon its right hand side and there provided with a sprocket wheel 7' which conveys power through the medium of a sprocket chain 8 to another sprocket wheel 9 arranged upon one extremity of a transverse shaft 10 that is journaled in the sides of the carrier chute, the said shaft 10 being further provided with a plurality of knives 11. The shaft 10 is further provided with additional sprocket wheels 12 and 13, the former of which transmits power to a pair of transverse shafts 14 journaled in the inclined portion of the carrier chute, while the latter transmits power to a transverse shaft 15 journaled in the rear end of the carrier chute. The aforesaid shafts 14 are each provided with a plurality of longitudinally disposed paddles 16 and are connected with each other by power transmission chain 17. The rear end of the carrier chute 6 is somewhat enlarged and has its floor cut away so that a circular opening in the same is formed as at 18, and a hopper 19 is secured beneath this end of the said chute with its open end in alinement with the circular floor opening in the chute; the floor of the hopper being a screen 100.

A vertical stub shaft 20 is supported in the hopper by a collar 21 which in turn is supported by brackets 22 arranged upon opposite sides of the rear end of the carrier chute and a bevel gear 23, one member of which is carried by the stub shaft and one member by the shaft 15, conveys power from the shaft 15 to the stub shaft. A plurality of knives 24 are secured to the lower extremity of the stub shaft in the hopper and are rotated by that shaft. Referring now to the drag frame 3 the same is provided with a plurality of transverse shafts 25 to each extremity of which rollers 26, each having a concave periphery, are secured and an arm 27 extending transversely of the roller shafts is connected to each by a link 28.

29 is a lever which is connected to the arm 27 in such a manner that it may be used to rock the said roller shafts simultaneously and a suitable rack 30 which is secured to the drag frame serves to lock the lever in any desired position. A plurality of tooth bars 31 provided with teeth 32 depend beneath the rollers 26 and are secured thereto through the medium of chains 33 and one of the said tooth bars is further secured by a chain 34 to the side of the frame 1; the several tooth bars being secured or locked together by links 35. It is readily seen that by inclining the lever toward the handles of the machine the roller shafts will be partially rotated thus winding the chains 33 upon the rollers and raising the teeth above the ground and a reverse movement of the lever will lower the teeth for use when weeds with very deep roots may be exterminated.

Operation: One or more horses are hitched to the draft bar 36 at the front of the machine and the operator grasps the handles to guide the excavating blade at the front end of the carrier chute which removes the earth and weeds and forces them up the carrier chute which movement is greatly aided by the paddles 16. When at the top of the incline the mass is cut and chopped by the knives 11 and it is forced toward the rear end of the machine where it drops into the hopper encountering the rotary knives by which it is further torn and separated after which the fine earth will fall through the floor of the hopper while the roots and tops of the weeds, etc., will accumulate in the hopper from which they can be removed and burned.

What is claimed is:—

1. In a weed exterminator, a main frame suitably supported and provided with a power transmission axle, a carrier chute mounted on said main frame having one end inclined for contact with the ground, transverse paddles arranged on shafts operatively connected and mounted in the inclined portion of the carrier chute, rotary knives mounted on a shaft journaled in the carrier chute and operatively connected with the last named shafts and with the power transmission axle, a transmission shaft mounted in the rear end of the carrier chute operatively connected with the rotary knife shaft, a hopper, a stub shaft operatively connected with the said transmission shaft and depending within the said hopper and rotary knives terminally carried by the said stub shaft.

2. In a weed exterminator, a main frame suitably supported and provided with a power transmission axle, a carrier chute mounted on said main frame having one end inclined for contact with the ground, transverse paddles arranged on shafts operatively connected and mounted in the inclined portion of the carrier chute, rotary knives mounted on a shaft journaled in the carrier chute and operatively connected with the last named shafts and with the power transmission axle, a transmission shaft mounted in the rear end of the carrier chute operatively connected with the rotary knife shaft, a hopper, a stub shaft operatively connected with the said transmission shaft and depending within the hopper, rotary knives terminally carried by the said stub shaft; an auxiliary frame secured to the rear end of the main frame, transverse shafts journaled in the auxiliary frame, rollers terminally carried by the last named shafts, a rocker arm connected to the last named shafts, a lever connected to the said rocker arm and tooth bars, provided with teeth, connected together and connected with the aforesaid rollers.

In testimony that I claim the foregoing as my own I have hereto affixed my signature in the presence of two subscribing witnesses.

CHRISTINA FELT.

Witnesses:
 FRANK P. ROOT,
 A. L. FREEGORD.

Copies of this patent may be obtained for five cents each, by addressing the "Commissioner of Patents, Washington, D. C."